United States Patent [19]
Yoshimura et al.

[11] Patent Number: 5,854,868
[45] Date of Patent: Dec. 29, 1998

[54] OPTICAL DEVICE AND LIGHT WAVEGUIDE INTEGRATED CIRCUIT

[75] Inventors: Tetsuzo Yoshimura; Wataru Sotoyama, both of Kawasaki, Japan

[73] Assignee: Fujitsu Limited, Kanagawa, Japan

[21] Appl. No.: 694,705

[22] Filed: Aug. 9, 1996

Related U.S. Application Data

[63] Continuation-in-part of Ser. No. 493,751, Jun. 22, 1995.

[30] Foreign Application Priority Data

| Jun. 22, 1994 | [JP] | Japan | 6-140502 |
| Aug. 25, 1994 | [JP] | Japan | 6-200974 |
| Aug. 30, 1994 | [JP] | Japan | 6-204922 |
| Mar. 17, 1995 | [JP] | Japan | 7-59240 |
| Mar. 20, 1995 | [JP] | Japan | 7-61092 |
| Feb. 14, 1996 | [JP] | Japan | 8-026888 |

[51] Int. Cl.$^6$ .................................................. G02B 6/30
[52] U.S. Cl. ................... 385/50; 385/14; 385/49
[58] Field of Search ................... 385/14, 15, 24, 385/43, 48–50, 129–132

[56] References Cited

U.S. PATENT DOCUMENTS

| 4,087,159 | 5/1978 | Ulrich | 385/129 |
| 4,571,080 | 2/1986 | Papuchon et al. | 356/345 |
| 4,571,377 | 2/1986 | McGinniss et al. | 430/281.1 |
| 4,666,236 | 5/1987 | Mikami et al. | 385/51 |
| 4,711,514 | 12/1987 | Tangonan et al. | 385/130 |
| 5,028,105 | 7/1991 | Drexhage et al. | 385/33 |
| 5,292,620 | 3/1994 | Booth et al. | 430/290 |
| 5,439,647 | 8/1995 | Saini | 385/14 X |
| 5,452,118 | 9/1995 | Maruska | 385/14 X |
| 5,460,907 | 10/1995 | Ducharme et al. | 385/5 X |

FOREIGN PATENT DOCUMENTS

| 0 262 409 A2 | 4/1988 | European Pat. Off. . |
| 0 358 476 | 3/1990 | European Pat. Off. . |
| 0 386 958 A1 | 9/1990 | European Pat. Off. . |
| 0 449 125 A2 | 10/1991 | European Pat. Off. . |
| 0 452 895 A1 | 10/1991 | European Pat. Off. . |
| 0 461 719 | 12/1991 | European Pat. Off. . |
| 0 472 296 A1 | 2/1992 | European Pat. Off. . |
| 0 506 368 A2 | 9/1992 | European Pat. Off. . |
| 0 541 303 A2 | 5/1993 | European Pat. Off. . |
| 0 617 314 A1 | 9/1994 | European Pat. Off. . |
| 59-222820 | 12/1984 | Japan . |
| 2281047 | 11/1990 | Japan . |
| 4204423 | 7/1992 | Japan . |
| 5142599 | 6/1993 | Japan . |
| 5265063 | 10/1993 | Japan . |
| 2 272 306 | 5/1994 | United Kingdom . |
| WO 91/10149 | 7/1991 | WIPO . |

OTHER PUBLICATIONS

"Two–wavelength photorefractive dynamic optical interconnect"; R. McRuer et al.; *Optics Letters*; Nov. 1, 1989; 1, No. 21, Washington, DC; pp. 1174–1176.

Zayats A V et al: "Optical transistions and nonlinearities in amorphous Si/SiO/sub 2/quantum structures" chapters I & II * p. 309 –p. 320*, SPIE vol. 2139 (1994).

WO 93/08574 A (British Telecommunications Public Limited Company). "Optical Memory", published Apr. 29, 1993.

WO 93/07179 A (Institut Fur Neue Materialien Gemeinnutzige). "Composite Materials Containing Nanoscalar Particles, Process For Producing Them And Their Use For Optical Components", published Apr. 15, 1993.

WO 90/10884 A (Pacific Bell). "Improved Fiber Optic Distribution System", published Sep. 20, 1990.

(List continued on next page.)

*Primary Examiner*—John D. Lee
*Attorney, Agent, or Firm*—Armstrong, Westerman, Hattori, McLeland & Naughton

[57] ABSTRACT

A process for integrating optical devices and optical waveguides which comprises forming a refractive index distribution pattern and/or waveguide pattern on a substrate after mounting an optical device on the substrate.

15 Claims, 6 Drawing Sheets

OTHER PUBLICATIONS

Applied Physics Letters, vol. 62, No. 24, 14 Jun. 1993, pp. 3068–3070, XP000380957 Tumolillo Jr T A et al: "Multilevel Registered Polymeric Mach–Zehnder Intensity Modulator Array".

Thin Solid Films, vol. 244, No. 1/02, 15 May 1994, pp. 1007–1011, XP000468018 Hodge P et al: "Efficient Second–Harmonic Generation From All–Polymeric Langmuir–Blodgett AB Films Containing Up To 600 Layers".

Proceedings Of The European Conference On Optical Communication (EC, Amsterdam, Sep. 16–20, 1990 Post Deadline Papers, vol. 3, 16 Sep. 1990, PTT Nederland And Philips Research Laboratories, pp. 1015–1018, XP000436529 Erman M et al: "INP Monolithically Integrated Passive Access Node Switches For Very High Speed Optical Loop".

Japanese Journal Of Applied Physics, vol. 32 No. 12a, Dec. 1993, Tokyo JP, pp. L1746–L1749, XP002015570 K. Tajima: "All–Optical Switch–Off Time . . . ".

One World Through Communications, Florence, May 4,–8, 1992 vol. 1 Of 3, 1 Jan. 1992, Institute Of Electrical And Electronics Engineers, pp. 459–467, XP000300076 Jun Nishikido et al: "Optical Routing Control Using Coherent Pattern–Matching Circuit For Photonic Self–Routing Switch".

Proceedings Of The 5th Toyota Conference On Nonlinear Optical Materials, 6–9 Oct. 1991, Aichi–Ken Japan, pp. 317–322, XP002016713 Tetsuzo Yoshimura et al: "One–Dimensional Conjugated Polymer Film And Quantum Well Fabrication By Molecular Layer Deposition (MLD) And Chemical Vapor Deposition".

OPTICAL DEVICE AND LIGHT WAVEGUIDE INTEGRATED CIRCUIT

CROSS-REFERENCE TO RELATED APPLICATION

This is a continuation-in-part of application Ser. No. 08/493,751, filed Jun. 22, 1995.

BACKGROUND OF THE INVENTION

1. Field of the Invention

The present invention relates to a process for integrating optical devices and optical waveguides.

2. Description of the Related Art

The fields of data processing and communication have seen dramatic progress in the area of optical wiring, and the diffusion of optical technology such as optical parallel processors, optical ATMs and "fiber to the home" is expected to continue in the future. This will require various types of optical integrated circuits, including waveguide devices. Optical integrated circuits are also useful in optically related devices such as optical disks and displays.

Realization of these technologies will require optical circuit devices integrating optical devices such as opto-semiconductors, and optical waveguides. However, monolithic optical integrated circuits with semiconductor devices and optical waveguides formed on the same wafer require much time for formation of the waveguides, and are not practical from the standpoint of yields and wafer costs. Also, because of the limits on wafer sizes, large-area optical integrated circuits cannot be realized. It is also difficult to make them flexible. Furthermore, although in typical glass waveguide optical circuits of the prior art the optical devices are mounted after formation of the waveguides, the optical devices usually have extremely small outgoing beam sizes of about 1 $\mu$m, such as in the case of LDs, thus requiring many manhours for alignment of the waveguides, and resulting in loss of coupling due to mismatching or misalignment.

Moreover, no method has yet been realized for easy optical coupling between LDs or waveguides and optical fibers, to provide a high coupling efficiency.

SUMMARY OF THE INVENTION

It is an object of the present invention to provide a simple technique for integrating optical devices, particularly semiconductor devices, and optical waveguides, as well as a simple method for optical coupling between LDs or optical waveguides and optical fibers.

In order to overcome the problems mentioned above, the present invention provides a process for integrating optical devices and optical waveguides which comprises forming a refractive index distribution pattern and/or waveguide pattern on a substrate after mounting an optical device on the substrate.

According to the present invention, formation of a refractive index pattern or waveguide pattern on the substrate after mounting of the optical device allows realization of simple and high-precision alignment between the optical device and optical waveguide by photolithography techniques. Furthermore, according to the invention, gradual variation in the width of the optical waveguide or splitting of light exposure allows reduction in coupling loss, while changing the direction of thickness of the optical waveguide allows reduction in coupling loss due to mode mismatching.

DESCRIPTION OF THE PREFERRED EMBODIMENTS

The present invention will now be explained in detail with reference to the attached drawings.

Figure 1A:
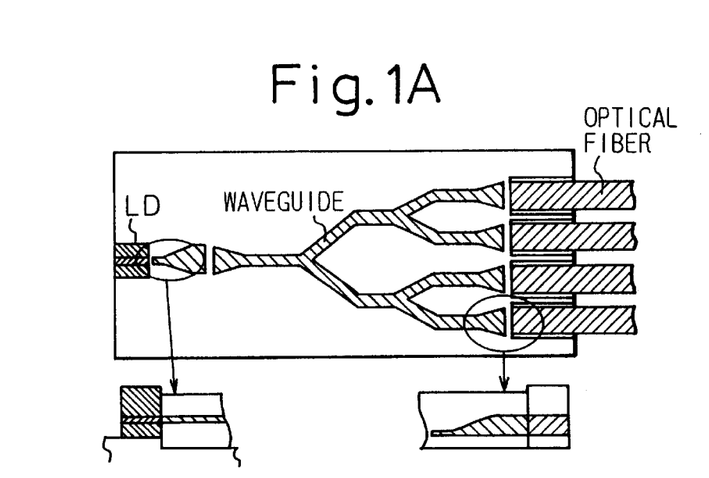
FIGS. 1A, 1B and 1C are schematic drawings illustrating an embodiment of the invention.

FIG. 1A is a schematic illustration of an embodiment of an optical integrated circuit produced by the process of the invention, and this circuit integrates an LD, a branched optical waveguide and optical fibers. The waveguide is split in two near the coupling section between the LD and waveguide, and is formed so that the respective sections gradually widen out at the boundaries, to achieve coupling between the waveguide. At the coupling section between the branched optical waveguide and the optical fibers, the waveguide is also formed so that it gradually widens and the thickness thereof gradually increases, to achieve coupling between the waveguide and the optical fibers.

Figure 1B:
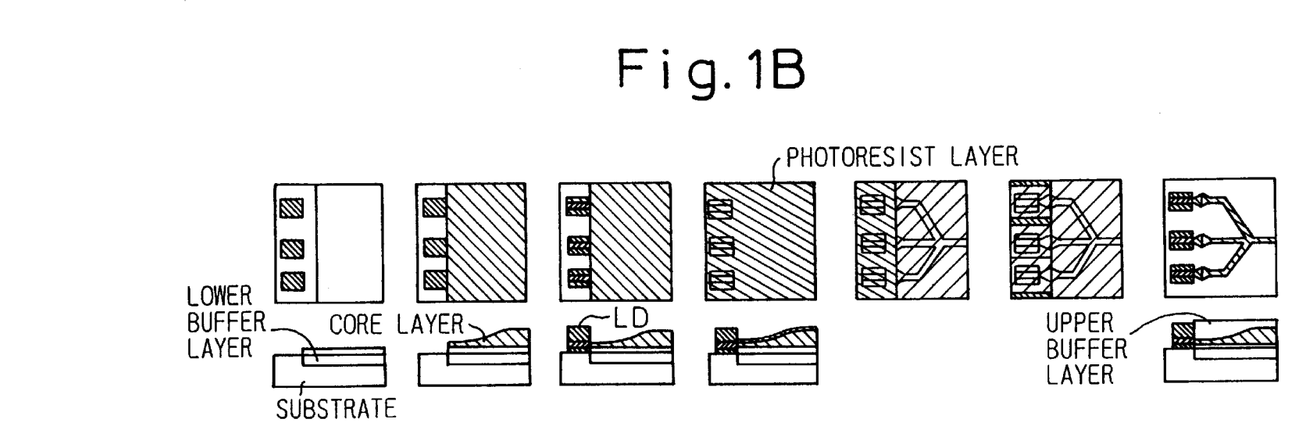

FIG. 1B is a schematic illustration of an embodiment of the process of integrating this type of circuit. Each of the steps are shown from left to right in the order of the process.

In the first step, a raised level is constructed on an Si substrate to form an electrode, and a buffer layer is then formed. In the second step, a core layer is formed on the buffer layer while varying the thickness. Next, solder is used to mount LDs on the electrodes (third step), and a photoresist layer is applied (fourth step). Here, spray application is useful for reducing the effect of the raised level. The resist used in this embodiment was a type with non-irradiated sections retained.

The waveguide pattern for the optical circuit is then exposed to light (fifth step). Here, it is advantageous to use projection light which minimizes the effect of the raised level. The waveguide pattern connected to the light-emitting tips (edges or ends) of the LDs is exposed to light (sixth step), matching the marker of each LD. Here as well, it is advantageous to use projection light which minimizes the effect of the raised level. Finally, after formation of the waveguide by RIE, the resist is peeled off, and the buffer layer is coated (seventh step). The coating may be accomplished by spray coating, dip coating or spin coating.

In the process described above, the LDs were mounted after formation of the waveguide layer, but the waveguide layer may also be formed after mounting of the LDs. Other modifications are also possible.

Application of the process described above provides the following effects.

1. A positioning precision of 1 $\mu$m or less for the waveguide connecting to the LD outgoing beam end is possible by normal pattern exposure. When the LDs are mounted after formation of the waveguide, many manhours are required to realize the same precision, making it impractical. Vertical alignment may be easily achieved to a precision of 1 $\mu$m or less by adjusting the solder and buffer layer thickness.

2. Separation of the optical circuit and the waveguide connected to the LD outgoing beam end helps to absorb mispositioning between each optical device at their boundaries. In order to increase the mispositioning tolerance, the waveguide width may be widened at the boundaries. Also, in order to prevent increasing loss, the enlarging of the width may be gradual. The boundaries do not necessarily have to form a gap, and they may be connected by an overlapping exposure.

3. With a core thickness matching the LD, spot size mismatches will occur with the fibers. Thus, the thickness is varied gradually along the waveguide, to approximate the spot size of the fibers at the connection terminal with the fibers. The width of the waveguide may also be gradually changed to approximate the spot size of the fibers.

Figure 1C:
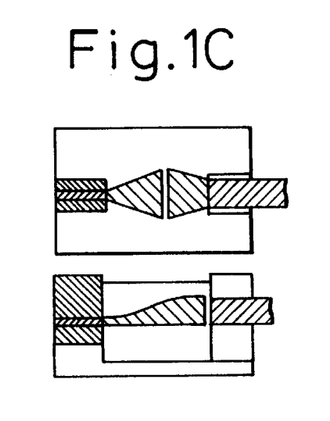

4. Also, as shown in FIG. 1C, the same process described above may be used even for connecting LDs to optical fibers, without arranging an optical circuit section.

Figure 2A:
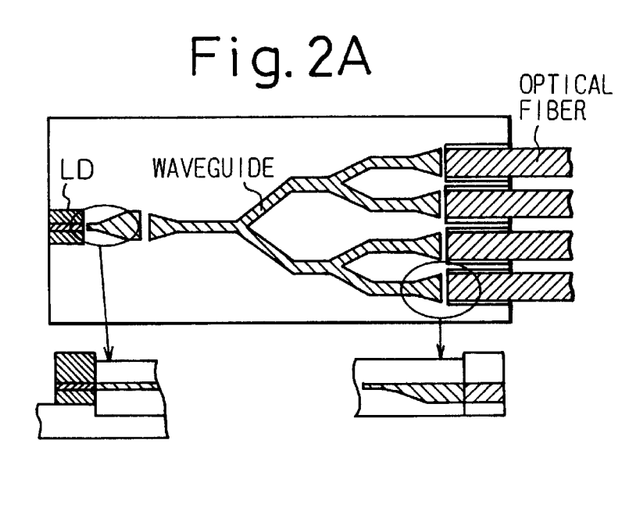
FIGS. 2A, 2B and 2C are schematic drawings illustrating another embodiment of the invention.

FIG. 2A is a schematic drawing of another embodiment of an optical integrated circuit. This circuit has roughly the same construction as the one shown in FIG. 1A, but differs somewhat in that the thickness of the waveguide is varied at the coupling section between the branched optical waveguide and the optical fibers (FIG. 2C).

Figure 2B:
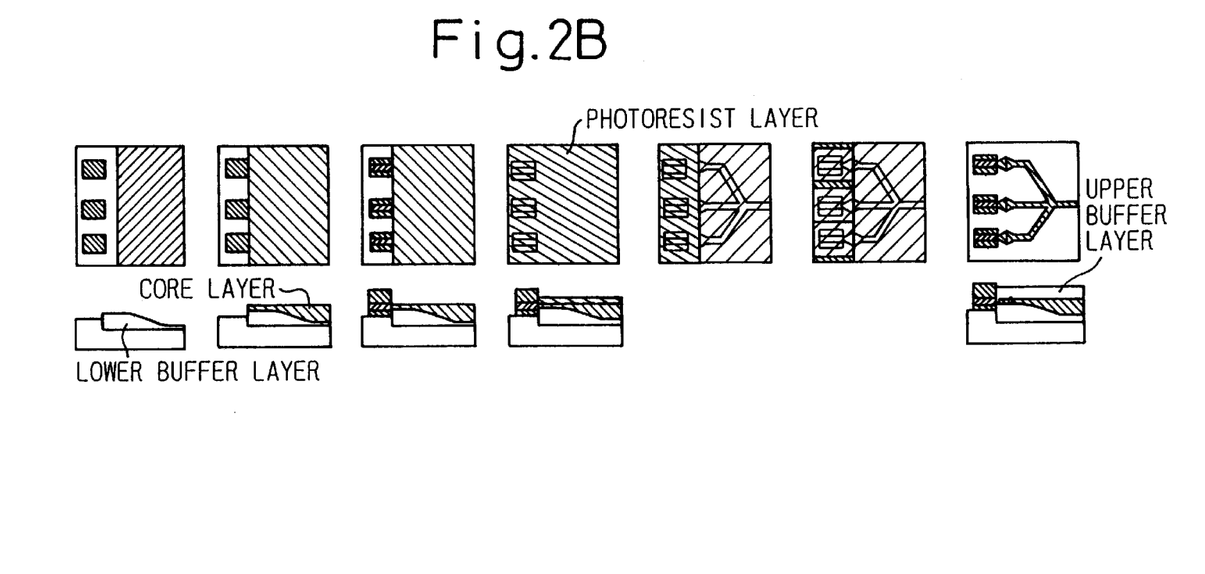
Figure 2C:
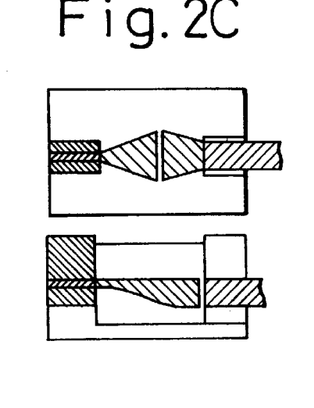

FIG. 2B is a schematic drawing which illustrates an embodiment of a process for this circuit integration. As in FIG. 1B, the steps proceed from left to right in the drawing.

In the first step, a raised level is constructed on an Si substrate to form an electrode, and a buffer layer is then formed while varying the thickness. In the second step, a core layer (waveguide layer) is formed on the buffer layer. Here, the variation in the thickness of the underlying buffer layer causes variation in the thickness of the core layer.

The third to seventh steps then follow in exactly the same manner as explained for FIG. 1B.

In the process described above, the LDs were mounted after formation of the waveguide layer, but the waveguide layer may also be formed after mounting of the LDs. Other modifications are also possible.

Application of this process provides the same advantages as explained in 1–3 above, and as explained in 4 above and shown in FIG. 2C, the same process may be used even for connecting LDs to optical fibers, without arranging an optical circuit section.

The waveguide may be formed using a highly transparent, highly heat-resistant polymer such as a fluorinated polyimide, or quartz or another glass or polymer material. The same type of material may also be used for the underlying buffer layer, or an organic and/or inorganic hybrid may be used. The underlying buffer layer and waveguide layer may also be subjected to a high temperature process (when these layers are formed prior to LD mounting), but the upper buffer layer is preferably formed through a process at 200°–400° C. so as not to melt the LD mounting solder.

The film forming method for polymer systems may be spin coating, dip coating, spray coating, or a vapor phase growth process such as evaporation polymerization or CVD. For glass systems, sputtering, evaporation, CVD, ion plating or the like may be employed, and when a sol-gel method is used, spin coating, dip coating or spray coating may be employed.

FIGS. 3A–3C and FIGS. 4A–4C illustrate embodiments using a photopolymer or photoglass (a polymer or glass whose refractive index varies with light irradiation, or polymer or glass which hardens or becomes soluble upon light irradiation), and they correspond to FIGS. 1A–1C and FIGS. 2A–2C.

The processes of FIG. 3B and FIG. 4B will be explained here, and since the process is the same whether a photopolymer or photoglass is used, the following explanation will deal only with embodiments using a photopolymer.

Figure 3A:
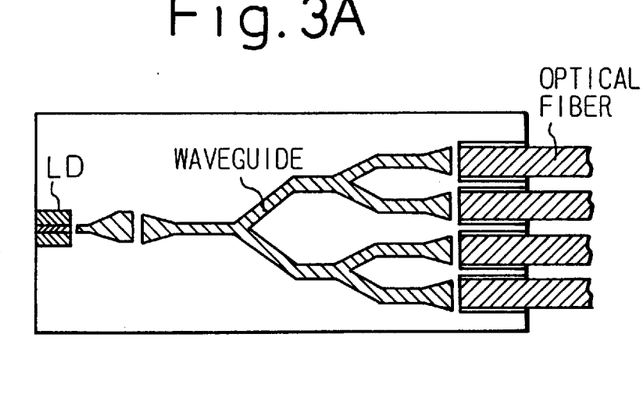
FIGS. 3A, 3B and 3C are schematic drawings illustrating yet another embodiment of the invention.
Figure 3B:
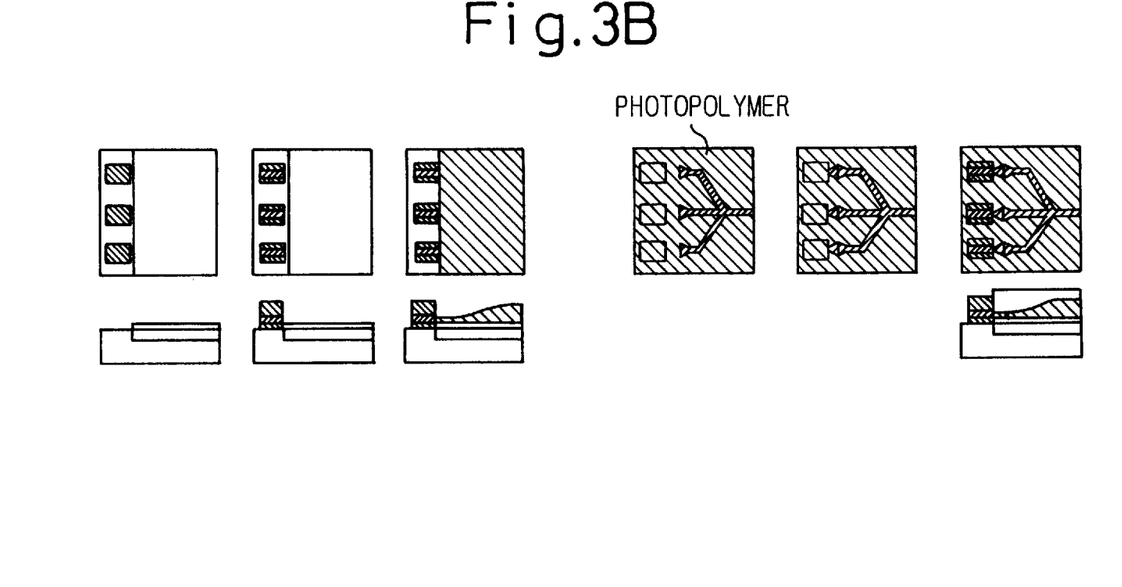

In the first step of the process shown in FIG. 3B, a raised level is constructed on an Si substrate to form an electrode, and then a buffer layer is then formed. In the second step, solder is used to mount LDs on the electrodes. A core layer is then formed on the buffer layer while varying the thickness (third step). Here, spray application is effective to reduce the effect of the raised level. The polymer used in this embodiment was one which forms waveguide channels on the light-irradiated sections.

The waveguide pattern for the optical circuit is then exposed to light (first exposure) (fourth step). Here, it is advantageous to use projection light which minimizes the effect of the raised level. The waveguide pattern connected to the LD light-emitting end is exposed to light (second exposure) (fifth step), matching the marker of each LD. Here as well, it is advantageous to use projection light which minimizes the effect of the raised level. Finally, the buffer layer is coated (sixth step). The coating may be accomplished by spray coating, dip coating or spin coating.

Various modifications are possible in the process described above.

Figure 3C:
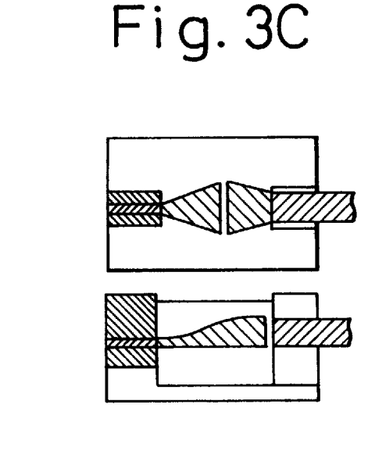

Application of the process described above provides the same advantages explained previously in 1–3, and as explained in 4 above and shown in FIG. 3C, the same process may be used even for connecting LDs to optical fibers, without arranging an optical circuit section.

Figure 4A:
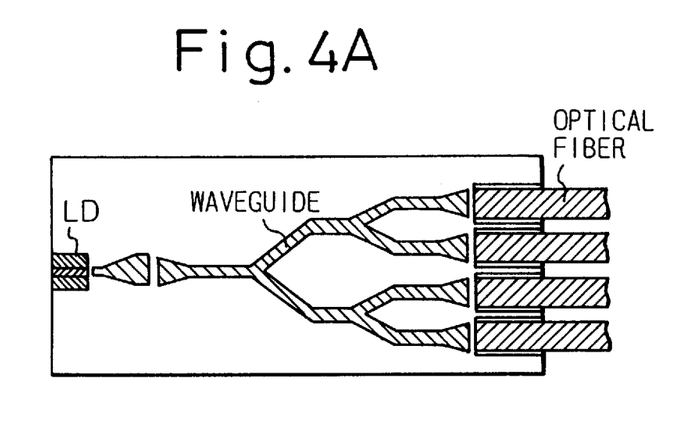
FIGS. 4A, 4B and 4C are schematic drawings illustrating yet another embodiment of the invention.
Figure 4B:
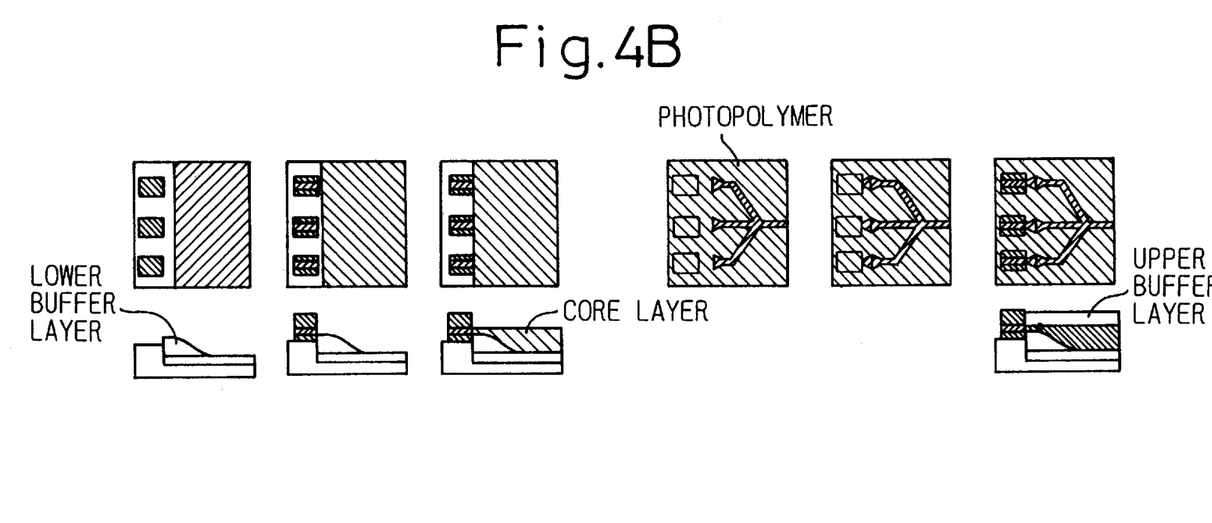

In the first step of the process shown in FIG. 4B, a raised level is constructed on an Si substrate to form an electrode, and then a buffer layer is then formed while varying the thickness. In the subsequent second step, solder is used to mount LDs on the electrodes. A core layer is then formed on the buffer layer (third step). Here, the variation in the thickness of the underlying buffer layer causes variation in the thickness of the core layer. Formation of the core layer may be accomplished by spray coating, dip coating or spin coating.

The fourth to sixth steps then follow in exactly the same manner as explained for FIG. 3B.

Various modifications are possible in the process described above.

Figure 4C:
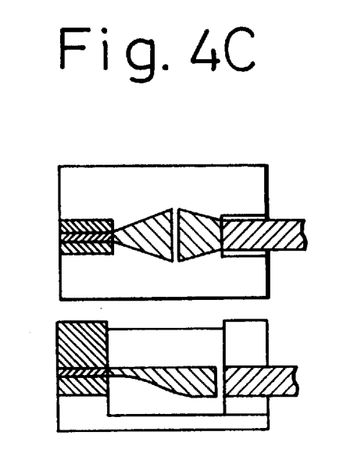

Application of the process described above provides the same advantages explained previously in 1–3 and, as explained in 4 above and shown in FIG. 4C, the same process may be used even for connecting LDs to optical fibers, without arranging an optical circuit section.

A photopolymer used to form the waveguide is generally an acrylic or epoxy polymer, and highly heat-resistant materials include photosensitive polyimides, benzocyclobutene, and the like. A fluorinated substance may be used for improved transmittance of LD light with a wavelength of 1.3 µm to 1.5 µm. Photoglass materials include glass materials containing Si and Ge, and commercially available photosensitive glass materials.

The material for the lower buffer layer may be of the same type as used for the waveguide, or it may be a highly transparent, highly heat-resistant polymer such as a fluorinated polyimide, or quartz or another glass or polymer material. An organic and/or inorganic hybrid may also be used. The lower buffer layer may also be subjected to a high temperature process (when it is formed prior to LD mounting), but the upper buffer layer is preferably formed through a process at 200°–400° C. so as not to melt the LD mounting solder.

The film forming method for polymer systems may be spin coating, dip coating, spray coating, or a vapor phase growth process such as evaporation polymerization or CVD. For glass systems, sputtering, evaporation, CVD, ion plating or the like may be employed, and when a sol-gel method is used, spin coating, dip coating or spray coating may be employed.

The foregoing explanation focuses on the integration of optical waveguides and LDs, but the invention is not restricted to this, and may likewise be applied for integration of refractive index distribution patterns with optical modulators, optical switches, wavelength converters, wavelength filters, and other optical devices.

Figure 5A:
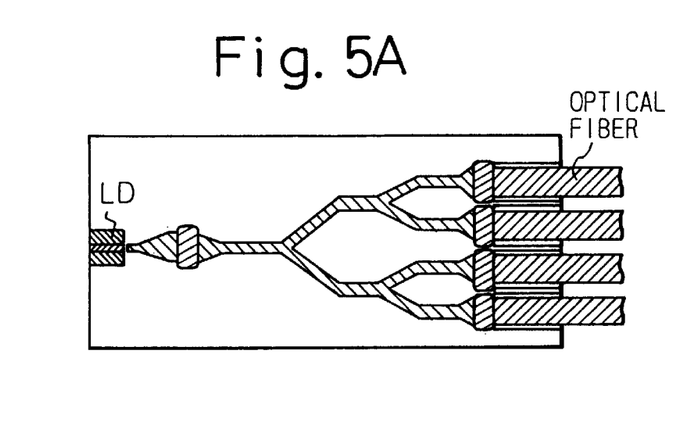
FIGS. 5A, 5B, 5C and 5D are schematic drawings illustrating yet another embodiment of the invention.
Figure 5B:
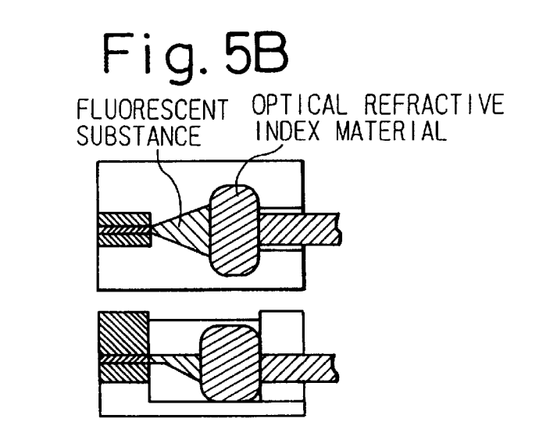
Figure 5C:
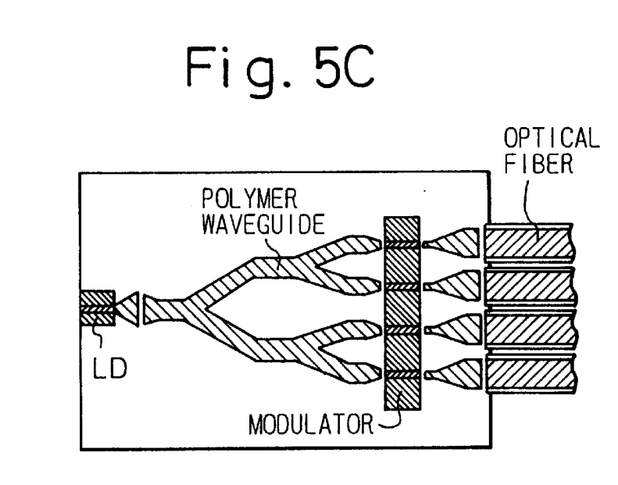
Figure 5D:
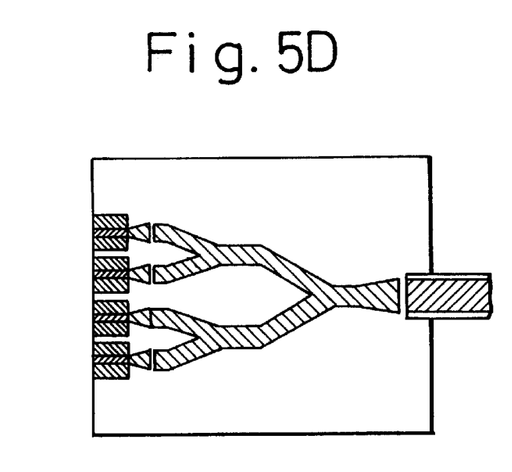

For example, FIG. 5C is a schematic drawing illustrating an embodiment integrating an LD and an optical modulator. This integrated circuit is useful as a simple, low-cost optical transmitter for an active optical connector, active optical circuit sheet, optical MCM, or the like. FIG. 5D is a schematic drawing illustrating an embodiment integrating LDs of different emission wavelengths. This is useful as a wavelength multiplex communications optical transmitter. The method for this integration may also be applied to coupling between LDs and fibers, as shown in FIGS. 1C, 2C, 3C and 4C.

The preceding embodiment was described with respect to a waveguide pattern, but any desired refraction pattern other than a waveguide may be formed, such as a lens, prism, grating, pinhole, mirror, slit or hologram.

FIGS. 5A and 5B show other embodiments for compensating for mispositioning between waveguides. In these embodiments, a photopolymer or photoglass is formed between waveguides or between waveguides and fibers, and light of a wavelength to which the material is sensitive is emitted thereon from the fibers or waveguides (from either one, but preferably from both). This forms a coupling path between the two, and further increases the coupling efficiency between the two. Further, by imparting fluorescence to the optical waveguide, writing light may be emitted from the waveguide by simply irradiating fluorescent excitation light into the waveguide. If an LD is also connected, the writing light may be emitted from the LD.

Figure 6:
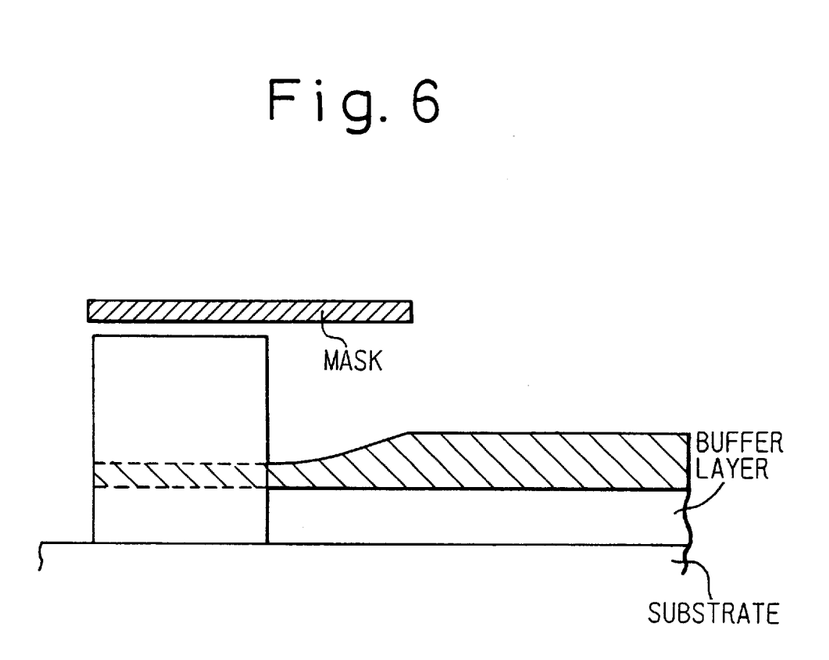
FIG. 6 is a schematic drawing illustrating an embodiment of a method of forming a layer while varying the thickness, according to the process of the invention.

FIG. 6 shows an embodiment of a process for growing the layer while varying the layer thickness. For example, a mask may be positioned over the substrate on which a buffer layer has been formed, to cause variation in the thickness of the layer formed by vapor phase growth or a spray method. It is effective to move the mask during this time for greater control over the tapering of the various sections. In this case, for greater control over the film thickness at the thin end, a uniform layer of a prescribed thickness may be formed first prior to positioning the mask and then forming the above-mentioned film.

As explained above, the present invention provides a simple integrating technique for optical devices (especially semiconductor devices) and optical waveguides and a simple optical coupling technique between LDs or waveguides and fibers, making it possible to obtain optical integrated circuits characterized by having low cost, high functionality, large surface area and flexibility.

We claim:

1. A process for integrating optical devices and optical waveguides which comprises: first mounting one or more optical devices on a substrate, and then forming a refractive index distribution pattern and/or waveguide pattern on said substrate, by the steps of coating a material for forming said refractive index distribution pattern and/or waveguide pattern on said substrate and then patterning the material to form said refractive index distribution pattern and/or waveguide pattern, to form an optical coupling path communicating with said one or more optical devices.

2. The process of claim 1, wherein the waveguide thickness is gradually varied at prescribed locations.

3. The process of claim 2, wherein thickness variation is produced during formation of a waveguide core layer.

4. The process of claim 2, wherein thickness variation is first produced in a lower layer of a waveguide core layer, and then a waveguide core layer is formed thereon.

5. The process of claim 1, wherein the operation for forming the refractive index distribution pattern and/or waveguide pattern is divided into two or more steps.

6. The process of claim 5, wherein at least the first operation for forming the refractive index distribution pattern and/or waveguide pattern includes an operation for forming the pattern in which a positioning mark of the mounted optical device is aligned with a standard.

7. The process of claim 1, wherein optical fibers are situated at one end of the waveguide.

8. The process of claim 1, wherein the waveguide is made of a polymer or glass.

9. The process of claim 1, wherein the waveguide is a photosensitive substance.

10. A process for integrating optical devices and optical waveguides which comprises forming a split refractive index distribution pattern and/or waveguide sections to form a waveguide pattern on a substrate after mounting an optical device on the substrate, by the steps of coating a material for forming said refractive index distribution pattern and/or waveguide pattern on said substrate and then patterning the material to form said refractive index distribution pattern and/or waveguide pattern, with the operation for said forming divided into two or more steps and wherein at least one section of the waveguide pattern near the boundaries of the split waveguide sections is formed so as to be gradually wider than the other sections.

11. A process for integrating optical devices and optical waveguides which comprises forming a split refractive index distribution pattern and/or waveguide sections to form a waveguide pattern on a substrate after mounting an optical device on the substrate, with spacing formed at the boundaries of the split refractive index distribution pattern and/or waveguide sections to form the waveguide pattern, after which a photosensitive substance made of a material in which the refractive index or solubility is changed by light exposure, such as a photo-refractive index material or light curing material is applied to the regions which include said spacing, and light of a wavelength to which said photosensitive substance is sensitive is emitted from either or both the refractive index distribution pattern and.or optical waveguide pattern to form an optical coupling path.

12. The process of claim 11, wherein the operation for forming the refractive index distribution pattern and/or waveguide is divided into two or more steps.

13. A process for integrating optical devices and optical waveguides which comprises:

first mounting one or more optical devices on a substrate, forming a mask on said substrate, and then forming a waveguide pattern on the substrate, where the waveguide thickness is gradually varied at prescribed locations during formation of a waveguide core layer, the thickness variation produced by forming a film with a vapor phase growth or spray method, to form an optical coupling path communicating with said one or more optical devices.

14. A process for integrating optical devices and optical waveguides which comprises:

first mounting one or more optical devices on a substrate, forming a mask on said substrate, and then forming a waveguide pattern on the substrate, where the waveguide thickness is gradually varied at prescribed locations, the thickness variations being first produced in a lower layer of the waveguide core layer with the waveguide core layer formed thereon, the thickness variations produced by forming a film with a vapor phase growth or spray method, to form an optical coupling path communicating with said one or more optical devices.

15. The process of claim 14, wherein the mask is moved during the process.

* * * * *